US008452181B2

(12) United States Patent  (10) Patent No.: US 8,452,181 B2
Yasuda et al.  (45) Date of Patent: May 28, 2013

(54) COMBINED OPTICAL AND ELECTRICAL TRANSMISSION ASSEMBLY AND MODULE

(75) Inventors: Hiroki Yasuda, Mito (JP); Koki Hirano, Hitachinaka (JP); Masahiko Kobayashi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 888 days.

(21) Appl. No.: 12/213,106

(22) Filed: Jun. 13, 2008

(65) Prior Publication Data
US 2008/0310848 A1 Dec. 18, 2008

(30) Foreign Application Priority Data

Jun. 15, 2007 (JP) .................. 2007-158159

(51) Int. Cl.
H04B 10/00 (2006.01)
H04B 10/12 (2006.01)
G02B 6/12 (2006.01)
G02B 6/44 (2006.01)
G02B 6/10 (2006.01)

(52) U.S. Cl.
USPC ........... 398/115; 398/116; 398/117; 398/141; 398/201; 385/14; 385/101; 385/130

(58) Field of Classification Search
USPC .......... 398/115, 116, 117, 201, 141; 385/101, 385/130, 14
See application file for complete search history.

(56) References Cited

U.S. PATENT DOCUMENTS

| | | | | |
|---|---|---|---|---|
| 3,809,908 A | * | 5/1974 | Clanton ...................... | 250/551 |
| 4,662,712 A | * | 5/1987 | Tabata et al. .................. | 385/102 |
| 4,730,330 A | * | 3/1988 | Plihal et al. ................. | 372/50.21 |
| 5,210,427 A | * | 5/1993 | Uchida et al. ................. | 250/551 |
| 5,577,138 A | * | 11/1996 | Chandrasekhar et al. ...... | 385/14 |
| 5,578,834 A | * | 11/1996 | Trobridge ..................... | 250/551 |
| 5,654,592 A | * | 8/1997 | Butler et al. ................... | 307/80 |

(Continued)

FOREIGN PATENT DOCUMENTS

| | | |
|---|---|---|
| CN | 2657025 Y | 11/2004 |
| EP | 1818944 A1 * | 8/2007 |

(Continued)

OTHER PUBLICATIONS

Chinese Office Action dated Nov. 27, 2010, with English translation.

(Continued)

Primary Examiner — Kenneth N Vanderpuye
Assistant Examiner — Amritbir Sandhu
(74) Attorney, Agent, or Firm — McGinn IP Law Group, PLLC

(57) ABSTRACT

A combined optical and electrical transmission assembly includes a combined optical, electrical and power cable having an optical fiber, electrical wiring and a power line combined therein or a combined optical and electrical cable having an optical fiber and electrical wiring combined therein, and a combined optical and electrical transmission module that includes an electrical-to-optical conversion unit having a laser for converting electrical signals to optical signals and a driving IC for driving the laser, and/or an optical-to-electrical conversion unit having a photodiode for converting optical signals to electrical signals and an amplification IC for amplifying electrical signals from the photodiode. The combined optical and electrical transmission module is connected to both ends of the combined optical, electrical and power cable or the combined optical and electrical cable.

17 Claims, 8 Drawing Sheets

31 COMBINED OPTICAL, ELECTRICAL AND POWER CABLE
32 COMBINED OPTICAL AND ELECTRICAL TRANSMISSION MODULE
34 ELECTRICAL CONNECTOR
35 POWER CABLE
36 ELECTRICAL CONNECTOR
37 BRANCH POINT

U.S. PATENT DOCUMENTS

| | | | |
|---|---|---|---|
| 5,912,748 A * | 6/1999 | Wu et al. | 398/49 |
| 6,334,012 B1 | 12/2001 | Yoon et al. | |
| 6,343,171 B1 * | 1/2002 | Yoshimura et al. | 385/50 |
| 6,706,546 B2 * | 3/2004 | Yoshimura et al. | 438/31 |
| 6,720,582 B2 * | 4/2004 | Miyokawa et al. | 257/98 |
| 6,931,183 B2 * | 8/2005 | Panak et al. | 385/101 |
| 6,940,477 B2 | 9/2005 | Moon et al. | |
| 7,160,032 B2 * | 1/2007 | Nagashima et al. | 385/75 |
| 7,274,876 B2 * | 9/2007 | Gerszberg et al. | 398/115 |
| 7,359,647 B1 * | 4/2008 | Faria et al. | 398/171 |
| 7,394,989 B2 * | 7/2008 | Ozeki et al. | 398/141 |
| 7,447,437 B2 * | 11/2008 | Schunk | 398/135 |
| 7,699,114 B2 * | 4/2010 | Ullah et al. | 166/385 |
| 7,715,722 B1 * | 5/2010 | Hoke et al. | 398/115 |
| 7,924,861 B2 * | 4/2011 | Baba et al. | 370/419 |
| 2003/0034963 A1 | 2/2003 | Moon et al. | |
| 2004/0008992 A1 * | 1/2004 | Nishimura | 398/115 |
| 2004/0071382 A1 * | 4/2004 | Rich et al. | 385/12 |
| 2005/0286844 A1 * | 12/2005 | Lee | 385/109 |
| 2006/0067608 A1 * | 3/2006 | Kobayashi et al. | 385/14 |
| 2006/0088251 A1 * | 4/2006 | Wang et al. | 385/88 |
| 2006/0188202 A1 * | 8/2006 | Deans | 385/100 |
| 2006/0227836 A1 * | 10/2006 | Omori et al. | 372/50.124 |
| 2006/0277586 A1 * | 12/2006 | Baba et al. | 725/118 |
| 2007/0014522 A1 * | 1/2007 | Yamaguchi et al. | 385/88 |
| 2007/0019914 A1 * | 1/2007 | Ohtsu et al. | 385/89 |
| 2007/0104426 A1 * | 5/2007 | Yun et al. | 385/88 |
| 2007/0140633 A1 * | 6/2007 | Ohtsu et al. | 385/115 |
| 2007/0237472 A1 * | 10/2007 | Aronson et al. | 385/101 |
| 2007/0248358 A1 * | 10/2007 | Sauer | 398/115 |
| 2007/0280610 A1 * | 12/2007 | Mallya et al. | 385/101 |
| 2010/0166374 A1 * | 7/2010 | Lapp | 385/101 |
| 2011/0222815 A1 * | 9/2011 | Hamana et al. | 385/14 |

FOREIGN PATENT DOCUMENTS

| | | |
|---|---|---|
| GB | 2 112 544 A | 7/1983 |
| JP | 5-335689 A | 12/1993 |
| JP | 2000-214972 | 8/2000 |
| JP | 2002-366340 | 12/2002 |
| JP | 2004-311521 A | 11/2004 |
| JP | 2006-91241 A | 4/2006 |
| JP | 2006-284781 A | 10/2006 |
| JP | 2006-351765 A | 12/2006 |
| JP | 2007-4043 A | 1/2007 |
| JP | 2007-241211 A | 9/2007 |
| WO | WO 2007/091733 A2 | 8/2007 |

OTHER PUBLICATIONS

Japanese Office Action dated Nov. 20, 2012 with English translation thereof.

* cited by examiner

| 10 COMBINED OPTICAL AND ELECTRICAL TRANSMISSION ASSEMBLY |
| 11 COMBINED OPTICAL, ELECTRICAL AND POWER CABLE |
| 12 COMBINED OPTICAL AND ELECTRICAL TRANSMISSION MODULE |
| 13 ELECTRICAL CABLE |
| 14 ELECTRICAL CONNECTOR |
| 15 POWER CABLE |
| 16 ELECTRICAL CONNECTOR |
| 17 BRANCH POINT |

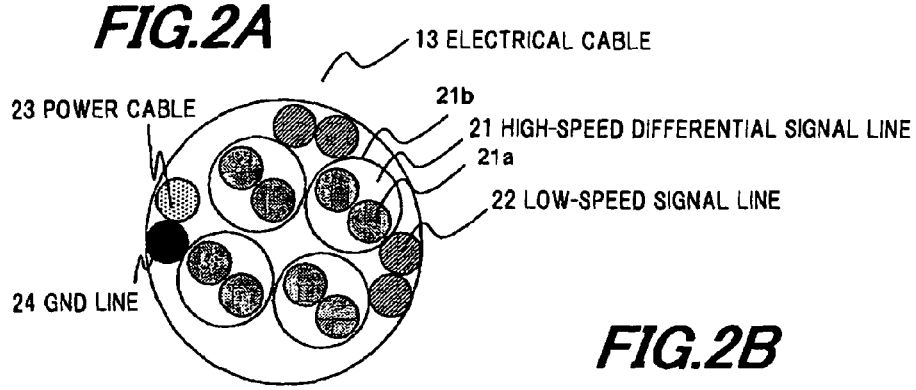
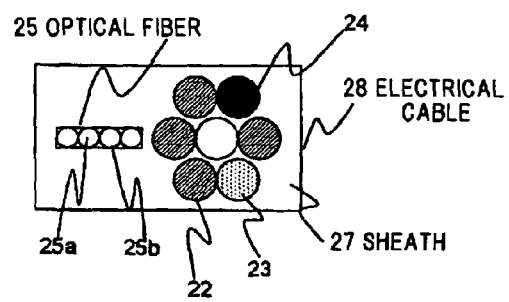
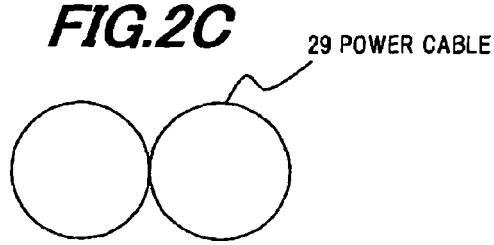
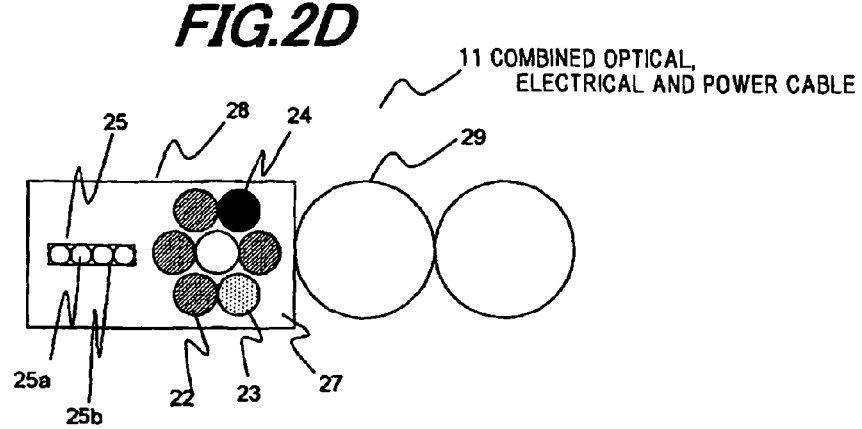

| 31 COMBINED OPTICAL, ELECTRICAL AND POWER CABLE |
| 32 COMBINED OPTICAL AND ELECTRICAL TRANSMISSION MODULE |
| 34 ELECTRICAL CONNECTOR |
| 35 POWER CABLE |
| 36 ELECTRICAL CONNECTOR |
| 37 BRANCH POINT |

FIG.4A

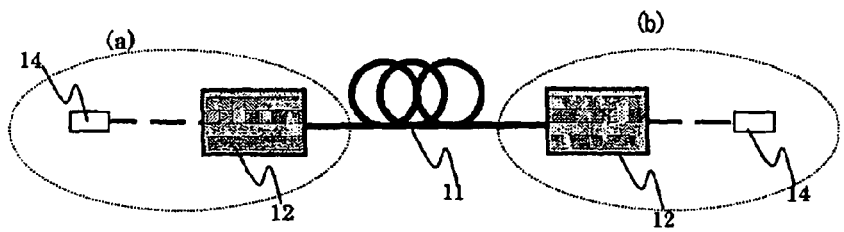

| 11 COMBINED OPTICAL, ELECTRICAL AND POWER CABLE |
| 12 COMBINED OPTICAL AND ELECTRICAL TRANSMISSION MODULE |
| 14 ELECTRICAL CONNECTOR |

FIG.4B

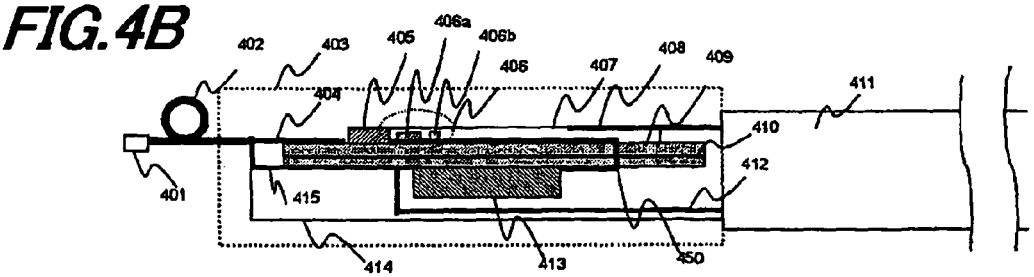

FIG.4C

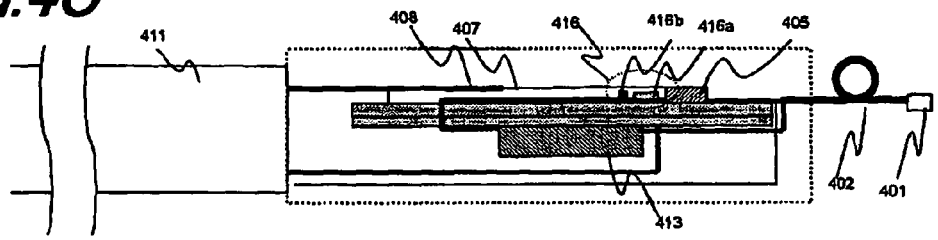

| 401 ELECTRICAL CONNECTOR |
| 402 ELECTRICAL CABLE |
| 406 ELECTRICAL-TO-OPTICAL CONVERSION UNIT |
| 407 FILM TYPE OPTICAL WAVEGUIDE |
| 408 OPTICAL FIBER |
| 411 COMBINED OPTICAL, ELECTRICAL AND POWER CABLE |
| 416 OPTICAL-TO-ELECTRICAL CONVERSION UNIT |

FIG.4D

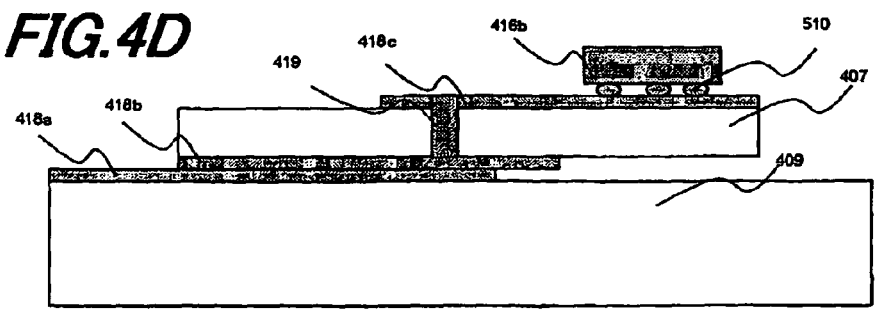

| 409 RIGID SUBSTRATE |
| 416b PHOTODIODE |
| 419 THROUGH-HOLE |

501 ELECTRICAL WIRING
502 RESIN SUBSTRATE
503 CORE
504 OVERCLADDING
505 OTPICAL DEVICE
506 IC
507 MIRROR
508 OPTICAL FIBER
509 GROOVE
516 COMBINED OPTICAL AND ELECTRICAL TRANSMISSION MODULE
517 FILM TYPE OPTICAL WAVEGUIDE
519 UNDERCLADDING
520 FLEXIBLE PRINTED CIRCUIT
521 INCLINED SURFACE

FIG.6A

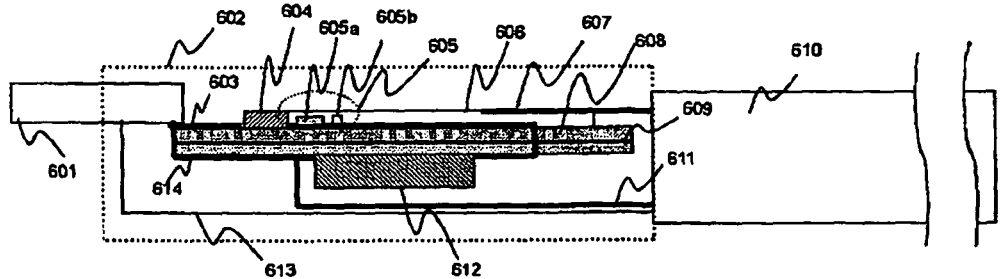

FIG.6B

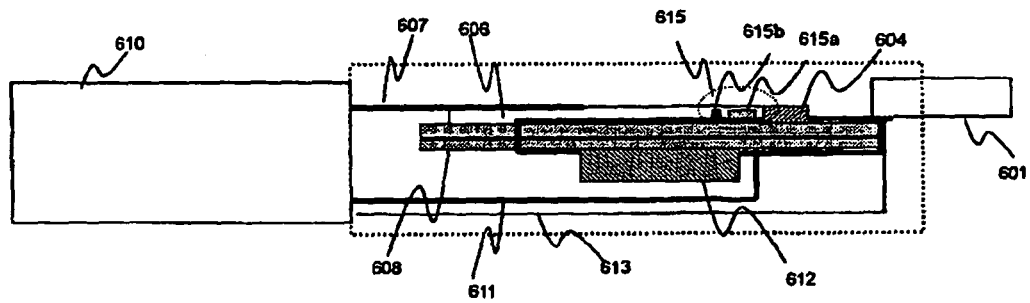

601 ELECTRICAL CONNECTOR
602 CHASSIS
603 HIGH-SPEED DIFFERENTIAL SIGNAL LINE
604 CARD EDGE CONNECTOR
605 ELECTRICAL-TO-OPTICAL CONVERSION UNIT
605a LASER-DRIVING IC
605b LASER (VCSEL)
606 FILM TYPE OPTICAL WAVEGUIDE
607 OPTICAL FIBER
608 RIGID SUBSTRATE
609 GROUND LAYER
610 COMBINED OPTICAL, ELECTRICAL AND POWER CABLE
611 POWER CABLE
612 VOLTAGE CONVERTER
614 POWER CABLE
615 OPTICAL-TO-ELECTRICAL CONVERSION UNIT
615a AMPLIFYING IC
615b PHOTODIODE

FIG. 7A

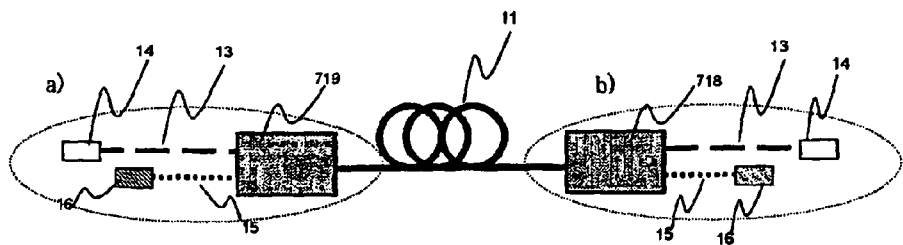

| 11 COMBINED OPTICAL, ELECTRICAL AND POWER CABLE |
| --- |
| 13 ELECTRICAL CABLE |
| 14 ELECTRICAL CONNECTOR |
| 15 POWER CABLE |
| 16 ELECTRICAL CONNECTOR |
| 718,719 COMBINED OPTICAL AND ELECTRICAL TRANSMISSION MODULE |

FIG. 7B

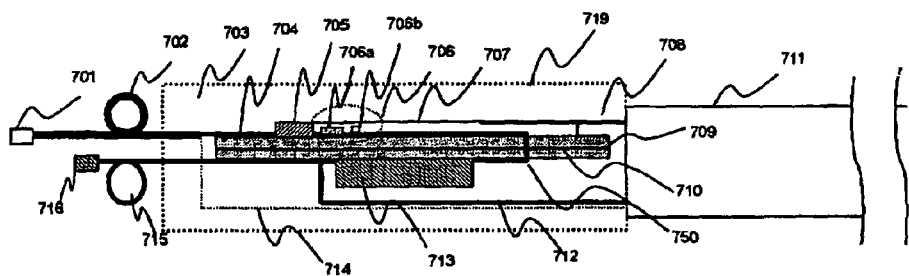

FIG. 7C

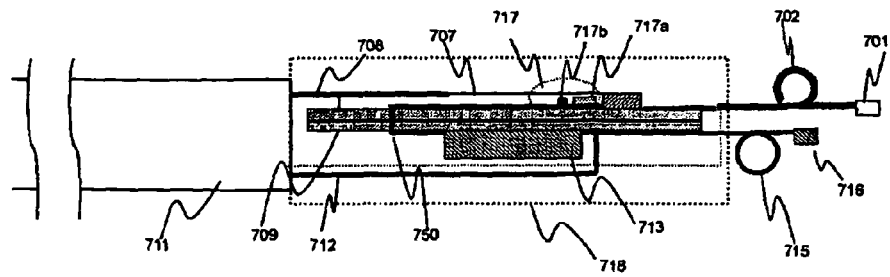

| | |
| --- | --- |
| 701 ELECTRICAL CONNECTOR | 710 GROUND LAYER |
| 702 ELECTRICAL CABLE | 711 COMBINED OPTICAL, ELECTRICAL AND POWER CABLE |
| 703 CHASSIS | 712 POWER CABLE |
| 704 HIGH-SPEED DIFFERENTIAL SIGNAL LINE | 713 VOLTAGE CONVERTER |
| 705 CARD EDGE CONNECTOR | 714 COMBINED CABLE |
| 706 ELECTRICAL-TO-OPTICAL CONVERSION UNIT | 715 POWER CABLE |
| 706a LASER-DRIVING IC | 716 ELECTRICAL CONNECTOR |
| 706b LASER (VCSEL) | 717 OPTICAL-TO-ELECTRICAL CONVERSION UNIT |
| 707 FILM TYPE OPTICAL WAVEGUIDE | 717a AMPLIFYING IC |
| 708 OPTICAL FIBER | 717b PHOTODIODE |
| 709 RIGID SUBSTRATE | 750 THROUGH-HOLE |

405 CARD EDGE CONNECTOR
407 FILM TYPE OPTICAL WAVEGUIDE
408 OPTICAL FIBER
409 RIGID SUBSTRATE
410 GROUND LAYER
413 VOLTAGE CONVERTER
501 ELECTRICAL WIRING
503 CORE
504 OVERCLADDING
505 OTPICAL DEVICE
506 IC
507 MIRROR
519 UNDERCLADDING
521 INCLINED SURFACE
800 PROTECTION MEMBER
801 OPTICAL FIBER COVERING PORTION

COMBINED OPTICAL AND ELECTRICAL TRANSMISSION ASSEMBLY AND MODULE

The present application is based on Japanese patent application No. 2007-158159, the entire contents of which are incorporated herein by reference.

BACKGROUND OF THE INVENTION

1. Field of the Invention

The present invention relates to a combined optical and electrical transmission assembly, which combines light and electricity to transmit signals and electrical power, and to a combined optical and electrical transmission module for electrical-to-optical or optical-to-electrical conversion.

2. Description of the Related Art

In recent years, with increasing display resolution and with increasing data dealt by information transmission device or storage device, there is an increasing demand for high-speed transmission lines capable of high-speed transmission of data. As high-speed transmission lines, there are used coaxial cables having a shield function, or differential transmission lines comprising a pair of differential lines in a shield, but their transmission distance is limited because of problems of noise or skew.

As a solution to this, there is a method that provides optical transmission lines between a computer and a monitor, or between servers, between which information signals are transferred, for optical transmission.

As devices used in these optical transmissions, there is a combined optical and electrical cable connected with a module at both its ends having an electrical connector for connecting, via an optical fiber, or a combined optical and electrical cable, optical devices such as LDs (laser diodes), PDs (photodiodes), or the like, a module comprising an IC (integrated circuit) for driving them, and an information transmission device or a storage device.

To drive the IC built in the module, JP-A-2000-214972 discloses use of electrical power supplied from the device, through the same connector as that connected with signal lines.

As prior art, there are JP-A-2000-214972 and JP-A-2002-366340.

When the module disposed to the combined optical and electrical cable is driven by using power supplied from an external device such as the information transmission device, storage device or the like, voltage of the power supplied is not always the same as voltage of driving the IC within the module. This restricts the IC that is possible to be used.

Also, typically, in high-speed IF (interface) without standardized optical transmission being taken into account, power is not assumed to be supplied to the IC driving the optical device, and power is separately required for driving the IC. To separately supply power for driving the IC, exclusive cables or connectors are separately required, which also complicates construction, causing problems with handling and cost.

Also, mounting the optical device typically requires a high mounting accuracy of not more than 10 μm, whereas mounting power cables permits a not less than 10-fold mounting error compared with mounting the optical device, and electrical signal line mounting accuracy is between optical device mounting accuracy and power cable mounting accuracy. Mounting those with different mounting accuracy on the same substrate requires matching to the strictest mounting accuracy specifications, which makes it difficult to fabricate the substrate, and makes the substrate costly.

Further, the high-speed electrical IF connector is not assumed to be used in optical connection, and its connection strength is weaker than that of a typical optical IF connector. This causes the problem that when the connector is pulled, the connector tends to slip out of a connector of the external device, which may cause an abrupt voltage change in the optical device, leading to a breakdown of the optical device.

SUMMARY OF THE INVENTION

Accordingly, it is an object of the present invention to provide a combined optical and electrical transmission assembly and module, which obviates the above problems, and which has construction below.

(1) According to one embodiment of the invention, a combined optical and electrical transmission assembly comprises:

a combined optical, electrical and power cable comprising an optical fiber, electrical wiring and a power line combined therein or a combined optical and electrical cable comprising an optical fiber and electrical wiring combined therein; and a combined optical and electrical transmission module comprising an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode, wherein the combined optical and electrical transmission module is connected to both ends of the combined optical, electrical and power cable or the combined optical and electrical cable, and the combined optical and electrical transmission modules are each connected with an electrical cable for transmitting electrical signals with an external device and a power cable for transmitting power, and the length of the power cable is shorter than that of the electrical cable.

(2) According to another embodiment of the invention, a combined optical and electrical transmission assembly comprises:

a combined optical, electrical and power cable comprising an optical fiber, electrical wiring and a power line combined therein; and a combined optical and electrical transmission module comprising an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode, wherein power cables branch off from both ends respectively of the combined optical, electrical and power cable, and combined optical and electrical cables, as which the combined optical, electrical and power cable is left by the power cables branching off therefrom, are each connected with the combined optical and electrical transmission module, and the combined optical and electrical transmission module is connected with an electrical cable for transmitting electrical signals with an external device.

In the above embodiment (2), the following modifications and changes can be made.

(i) The length of the power cables branching off from the combined optical, electrical and power cable is shorter than that from a position that the power cables branch off from the combined optical, electrical and power cable, to electrical connectors provided at tips of the electrical cables connected to the combined optical and electrical transmission modules.

(3) According to another embodiment of the invention, a combined optical and electrical transmission module comprises:

a combined optical, electrical and power cable comprising an optical fiber, electrical wiring and a power line combined therein or a combined optical and electrical cable comprising an optical fiber and electrical wiring combined therein; and an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode, wherein the combined optical and electrical transmission module is connected with an electrical cable for transmitting electrical signals with an external device, and a film type optical waveguide is disposed inside the combined optical and electrical transmission module, and the combined optical, electrical and power cable and the electrical cable transmit signals via the film type optical waveguide.

(4) According to another embodiment of the invention, a combined optical and electrical transmission module comprises:

a combined optical, electrical and power cable comprising an optical fiber, electrical wiring and a power line combined therein or a combined optical and electrical cable comprising an optical fiber and electrical wiring combined therein; and an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode, wherein a film type optical waveguide is disposed inside the combined optical and electrical transmission module, and the electrical-to-optical conversion unit and/or the optical-to-electrical conversion unit is disposed to the film type optical waveguide.

In the above embodiment (4), the following modifications and changes can be made.

(ii) An electrical cable with an electrical connector connected to an external device is connected to a rigid substrate disposed inside the combined optical and electrical transmission module, and the film type optical waveguide disposed on a flexible printed circuit is connected to the rigid substrate by a card edge connector.

(iii) An electrical cable with an electrical connector connected to an external device is connected to the rigid substrate, and the film type optical waveguide disposed on the flexible printed circuit is electrically connected to the rigid substrate by an anisotropic conductive resin or non-conductive resin.

(iv) The electrical-to-optical conversion unit and/or the optical-to-electrical conversion unit is disposed between the film type optical waveguide and the rigid substrate.

(5) According to another embodiment of the invention, a combined optical and electrical transmission module comprises:

a combined optical, electrical and power cable comprising an optical fiber, electrical wiring and a power line combined therein or a combined optical and electrical cable comprising an optical fiber and electrical wiring combined therein; and an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode, wherein a voltage converter for converting voltage supplied from outside is disposed inside the combined optical and electrical transmission module, and power is supplied to the driving IC and/or the amplification IC by the voltage converter.

In the above embodiment (5), the following modifications and changes can be made.

(v) The combined optical and electrical transmission module further comprises a rigid substrate inside thereof, the rigid substrate comprises an electrical ground layer inside thereof, and the electrical-to-optical conversion unit and/or the optical-to-electrical conversion unit disposed to the film type optical waveguide is disposed on one side of the rigid substrate, while a voltage converter for converting voltage supplied from outside is disposed on the other side of the rigid substrate.

In the above embodiment (3), the following modifications and changes can be made.

(vi) The combined optical and electrical transmission module is connected to both ends of the combined optical, electrical and power cable, and the combined optical and electrical transmission module is provided with an electrical connector in place of the electrical cable, and electrically connected with an external device by the electrical connector.

According to one embodiment of the invention, because arranging on the film type optical waveguide wiring the electrical-to-optical conversion unit and/or optical-to-electrical conversion unit requiring very high positional accuracy makes rigid substrate fabrication accuracy as good as on the order of a few tens of μm, it is possible to use the inexpensive rigid substrate, and facilitate making cost low.

Further, making the power cable shorter than the electrical cable allows inadvertent pulling force to be applied to the power cable, and prevented from being applied to the electrical cable. This prevents the electrical cable from slipping out of the external device by inadvertent pulling force.

BRIEF DESCRIPTION OF THE DRAWINGS

The preferred embodiments according to the invention will be explained below referring to the drawings, wherein:

FIG. 1A shows connection of an electrical cable to a combined optical and electrical transmission module, FIG. 1B shows connection of an electrical cable and a power cable to a combined optical and electrical transmission module, and FIG. 1C shows connection of an electrical cable to a combined optical and electrical transmission module and branching of a power cable of a combined optical, electrical and power cable;

FIGS. 2A to 2D are cross-sectional views showing an electrical cable (2A), a combined optical and electrical cable (2B), a power cable (2C), and a combined optical, electrical and power cable (2D), respectively:

FIG. 3A shows mounting of an electrical connector in place of the electrical cable of FIG. 1A to a combined optical and electrical transmission module, FIG. 3B shows mounting of an electrical connector in place of the electrical cable of FIG. 1B to a combined optical and electrical transmission module, and FIG. 3C shows mounting of an electrical connector in place of the electrical cable of FIG. 1C to a combined optical and electrical transmission module;

FIG. 4A corresponds to the combined optical and electrical transmission assembly in FIG. 1A;

FIG. 4B is a schematic cross sectional view showing a transmit (LD) side combined optical and electrical transmission module (12) in FIG. 4A;

FIG. 4C is a schematic cross sectional view showing a receive (PD) side combined optical and electrical transmission module (12) in FIG. 4A;

FIG. 4D is a schematic cross sectional view showing a modification to FIGS. 4A and 4B;

FIGS. 6A and 6B are schematic cross-sectional views showing modifications to the combined optical and electrical transmission modules of FIGS. 4B and 4C, respectively;

FIG. 7A corresponds to the combined optical and electrical transmission assembly in FIG. 1B;

FIG. 7B is a schematic cross sectional view showing a transmit (LD) side combined optical and electrical transmission module (719) in FIG. 7A;

FIG. 7C is a schematic cross sectional view showing a receive (PD) side combined optical and electrical transmission module (718) in FIG. 7A.

DETAILED DESCRIPTION OF THE PREFERRED EMBODIMENTS

Giving an outline of the invention, the invention relates to a combined optical and electrical transmission assembly and module, which combines and transmits light and electricity, and particularly to a low-cost and high-reliability combined optical and electrical transmission module.

Figure 1A:
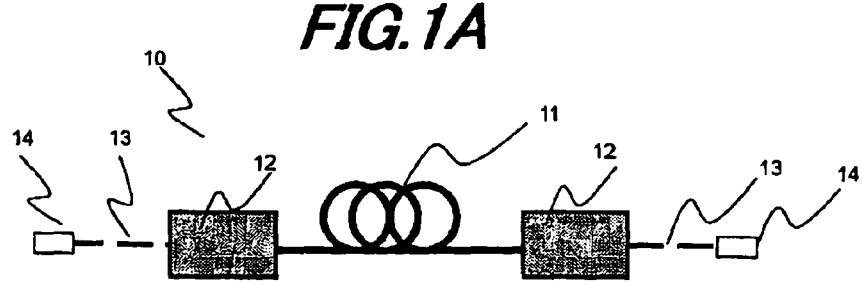
FIGS. 1A to 1C are illustrative diagrams showing schematic combined optical and electrical transmission assemblies according to the invention, where
Figure 1B:
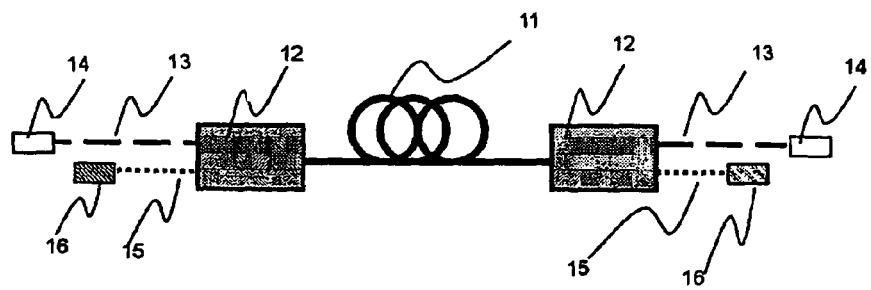
Figure 1C:
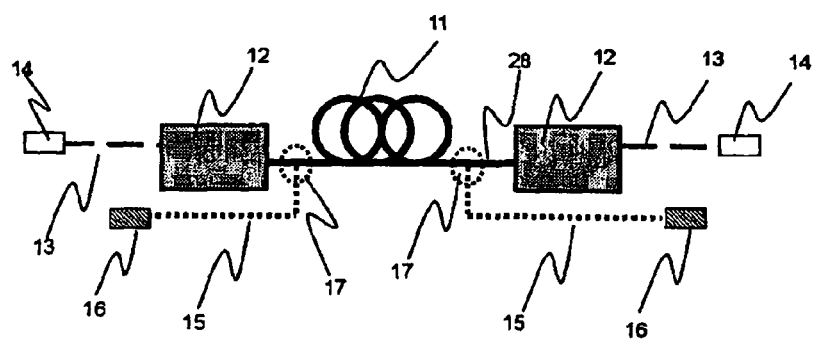

First, shown in FIGS. 1A to 1C is the entire structure of a combined optical and electrical transmission assembly.

A combined optical and electrical transmission module 12 is connected to an electrical cable 13 with an electrical connector 14 connected to an external device (not shown). In FIG. 2A is shown one example of the cross-sectional structure of the electrical cable 13. It comprises high-speed differential signal lines 21 used as transmission lines whose signal transmission speed is not less than 10 Mbps and whose signal lines 21a are covered with a metallic tube or a metallic wire-braided shield 21b, low-speed signal lines 22 used as transmission lines whose signal transmission speed is less than 10 Mbps, a power cable 23, a GND line 24, etc.

A combined optical, electrical and power cable 11 transmits optical signals to which electrical signals transmitted from the external device are converted in the combined optical and electrical transmission module 12, electrical signals transmitted from the external device without being converted in the combined optical and electrical transmission module 12, or electrical power.

The combined optical and electrical transmission modules 12 are respectively connected to both ends of the combined optical, electrical and power cable 11, while the electrical cable 13 is connected to each combined optical and electrical transmission module 12, to thereby constitute a combined optical and electrical transmission assembly 10.

In FIG. 2B is shown one example of the cross-sectional structure of a combined optical and electrical cable 28. The combined optical and electrical cable 28 comprises an optical fiber 25 (4-core tape type), low-speed signal lines 22, a power cable 23, a GND line 24, etc., which are integrally covered with a sheath 27 formed of an insulating material. In this embodiment, power for driving the combined optical and electrical transmission module 12 is supplied through the power cable 23 provided in the electrical cable 13 with the electrical connector 14 connected to the external device.

As shown in FIG. 2D, the combined optical, electrical and power cable 11 comprises a structure in which a power cable 29 is integral with the combined optical and electrical cable 28. Generally, the combined optical and electrical transmission modules 12 are respectively connected to both ends of the combined optical, electrical and power cable 11. In this case, inside one combined optical and electrical transmission module 12 is disposed a later-described electrical-to-optical conversion unit, while in the other combined optical and electrical transmission module 12 is disposed a later-described optical-to-electrical conversion unit, thereby allowing unidirectional communications. Also, both electrical-to-optical and optical-to-electrical conversion unit are disposed in each of the combined optical and electrical transmission modules 12 at both ends, thereby allowing bidirectional communications.

On the other hand, in the embodiment of FIG. 1A, the combined optical and electrical cable 28 may be used in place of the combined optical, electrical and power cable 11, in which case the combined optical and electrical transmission module 12 is connected to both ends of the combined optical and electrical cable 28.

Next shown in FIG. 1B is another embodiment. In addition to the structure of FIG. 1A, a power cable 15 is connected to the combined optical and electrical transmission module 12, to supply power for driving the combined optical and electrical transmission module 12. As shown in FIG. 2C, the power cable 15 comprises a pair of power cables 29. An electrical connector (or plug) 16 is attached to the other end of the power cable 15.

In this embodiment, power for driving the combined optical and electrical transmission module 12 is supplied through the power cable 15 with the electrical connector 16 connected to the external device. This is because power supply is limited where only the power cable 23 (see FIG. 2A) provided in the electrical cable 13 is used. Of course, the power cable 23 provided in the electrical cable 13 may also be used in driving the IC in the combined optical and electrical transmission module 12.

Generally, the electrical connector (or plug) 16 of the power cable 15 is stronger in connection strength than electrical connector 14 of electrical cable 13.

Accordingly, in this embodiment, the length of the power cable 15 is shorter than the length of the electrical cable 13. This allows pulling force to act on the power cable 15 with strong connection strength of the electrical connector (or plug) 16, before the inadvertent force acts on electrical connector 14 in a direction pulled out of the external device connector. Therefore, the inadvertent pulling force is unlikely to be applied to the electrical connector 14 attached to the electrical cable 13, thereby preventing the electrical connector 14 attached to the electrical cable 13 from slipping out of the external device connector.

Further shown in FIG. 1C is another embodiment. Power is supplied from electrical cable 13 with electrical connector 14 connected to an external device, to drive combined optical and electrical transmission module 12. One or more power cables 15, which do not drive the combined optical and electrical transmission module 12, is placed in combined optical, electrical and power cable 11, and provided with an electrical connector (or plug) 16 different from the electrical connector 14. Before the combined optical, electrical and power cable 11 is connected with the combined optical and electrical transmission module 12, the power cable 15 branches off at 17 from the combined optical, electrical and power cable 11, which is divided into the power cable 15 and combined optical and electrical cable 28. The power cable 15 is not connected to the combined optical and electrical transmission module 12, but the electrical cable 28 is connected to the combined optical and electrical transmission module 12.

Thus, this embodiment allows the combined optical and electrical transmission module 12 to be small-sized. In this case, as shown in FIG. 2D, the combined optical, electrical and power cable 11 may comprise a structure in which to facilitate branching of power cable 29, the branched power cable 29 is arranged at an end of the combined optical and electrical cable 28. In this embodiment, for the reason mentioned in the embodiment of FIG. 1B, the length of the power cable 29 is shorter than the length of the combined optical and electrical cable 28.

Figure 3A:
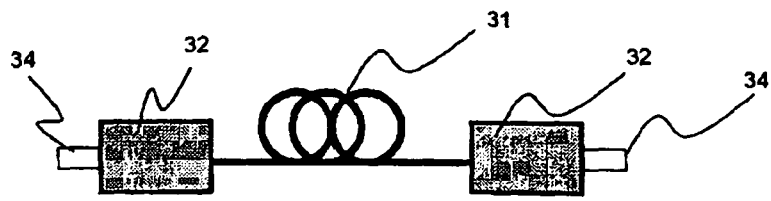
FIGS. 3A to 3C are illustrative diagrams showing schematic combined optical and electrical transmission assemblies, where
Figure 3B:
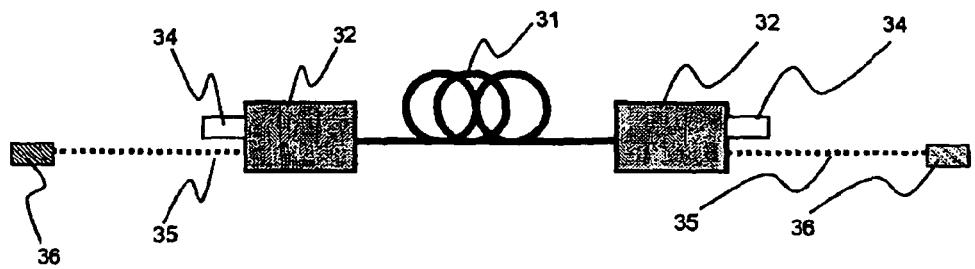
Figure 3C:
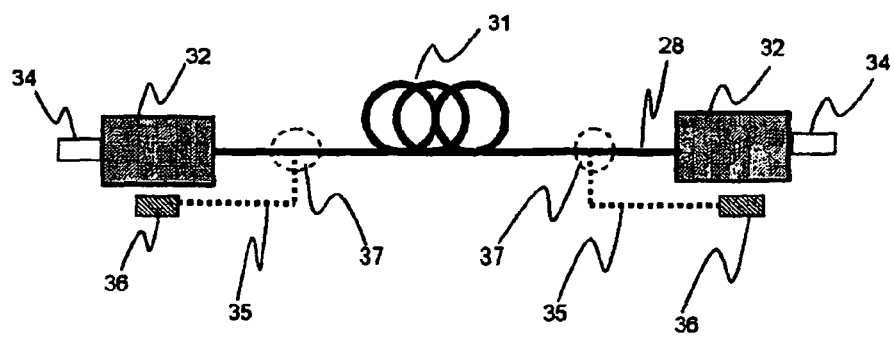

Further, the electrical cable 13 may be removed from the construction of FIGS. 1A to 1C, and as shown in FIGS. 3A to 3C, respectively, where an electrical connector 34 may be connected directly to a combined optical and electrical transmission module 32.

In this case, since the combined optical and electrical transmission module 32 is connected directly to external device via the electrical connector 34, it is possible to simplify construction while ensuring low cost.

Next is explained an internal structure of the combined optical and electrical transmission module 12.

Referring to FIGS. 4B and 4C, signals can be transmitted between an electrical cable 402 and a combined optical, electrical and power cable 411, by arranging the combined optical, electrical and power cable 411, the electrical cable 402 with an electrical connector 401 connected to an external device, an electrical-to-optical conversion unit 406 comprising a laser 406b for converting electrical signals from the electrical cable 402 to optical signals and IC 406a for driving the laser, or an optical-to-electrical conversion unit 416 comprising a photodiode 416b for converting optical signals from optical signal lines such as an optical fiber or an optical waveguide to electrical signals and an amplifying IC 416a for amplifying electrical signals from the photodiode 416b, and a film type optical waveguide 407 between the electrical cable 402 and the combined optical, electrical and power cable 411.

Figure 5A:
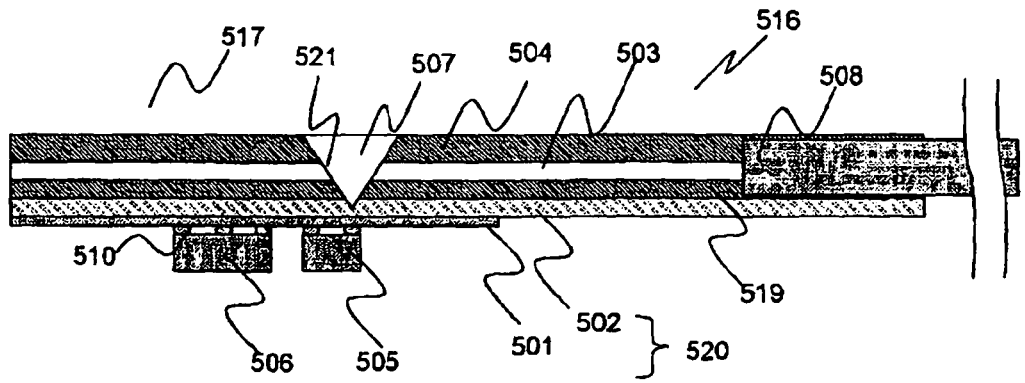
FIG. 5A is a side cross-sectional view showing a film type optical waveguide.

An enlarged view of an example (517) of the film type optical waveguide 407 is shown in FIG. 5A. A film type optical waveguide 517 comprises a core 503, an overcladding 504, and an undercladding 519 on a flexible printed circuit (FPC) 520 formed with electrical wiring 501 on a resin substrate 502 such as polyimide.

Figure 5B:
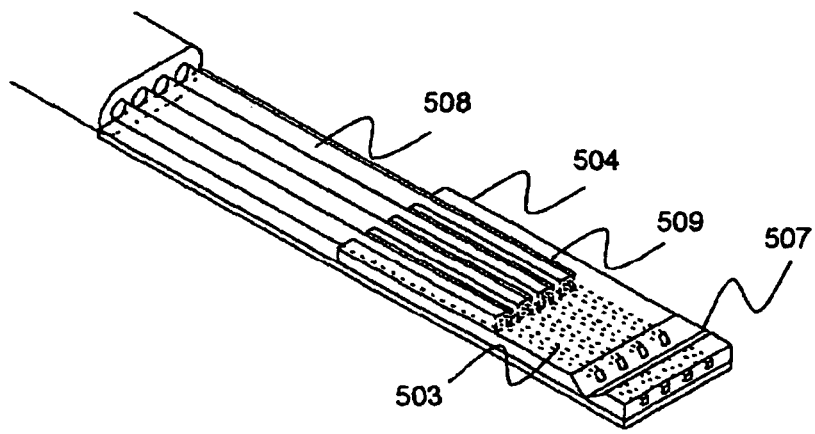
FIG. 5B is a perspective view showing the film type optical waveguide.

A material used for the film type optical waveguide 517 includes a resin such as acrylic, epoxy, polyimide, or the like. As shown in FIG. 5B, in the film type optical waveguide 517, an optical fiber insertion groove 509 is formed. Only by inserting an optical fiber 508 into this optical fiber insertion groove 509, the optical fiber 508 may be easily mounted. Even in the case of multicore optical fiber 508, mounting the optical fiber 508 in the film type optical waveguide 517 enhances productivity because the film type optical waveguide 517 and optical device 505 can be aligned together.

Accordingly, a combined optical and electrical transmission module 516 with the optical fiber 508, an optical device 505 such as a laser, a photodiode or the like, an IC 506 for driving the optical device 505, etc. mounted to the film type optical waveguide 517 facilitates making cost low.

On the other hand, when arranging the optical device 505 and the IC 506 on a rigid substrate 409 shown in FIGS. 4B and 4C, because of no need to provide electrical wiring 501 to the film type optical waveguide 517, it is possible to simplify the production process of the film type optical waveguide 517, such that the film type optical waveguide 517 can be produced at low cost. Also, by arranging the optical device 505 on the rigid substrate 409, heat dissipation effect of the optical device 505 can be enhanced and operation properties of the optical device 505 can be stabilized.

Also, as shown by a partial detailed cross-sectional view in FIG. 4B, the electrical cable 402 is connected to the rigid substrate 409, and likewise using a card edge connector 405 mounted on the rigid substrate 409, the film type optical waveguide 407 formed on a flexible printed circuit (see FIG. 5A) is mounted to the rigid substrate 409. In this mounting, use of the card edge connector 405 eliminates the step of heating the film type optical waveguide. Also, only by inserting the film type optical waveguide 407 into the card edge connector 405, it is possible to eliminate the need of alignment, thereby facilitating mounting.

Further, as another method for mounting the film type optical waveguide 407 on rigid substrate 409, there is a method mounting the film type optical waveguide 407 to the rigid substrate 409 using an anisotropic conductive resin or non-conductive resin. The anisotropic conductive resin refers to an adhesive resin mixed with microscopic conductive particles, which allows electrical conduction only in its portion on which a force acts. For example, there is an ACF (anisotropic conductive film), which is sandwiched between substrates to be connected, followed by being pressurized and heated, thereby allowing electrical connection between wirings.

Also, the mounting method using the non-conductive resin casts the non-conductive resin between wirings formed with bumps 510 on either the chip component (e.g., IC 506, optical device 505) side, or electrical wiring 501 side as shown in FIG. 5A, followed by pressurization and heating, thereby allowing connection between wirings and adhesive fixing. The mounting method using the anisotropic conductive resin or non-conductive resin involves the temperature process, but allows preventing adverse effects on optical properties of the film type optical waveguide because of the low-temperature process on the order of 150° C. And it has an advantage of low cost because of short time mounting on the order of a few tens of seconds.

As shown in FIG. 5A, on the film type optical waveguide 517 wiring surface, there are flip-chip-mounted the optical device 505 such as a laser or a photodiode, and the IC 506 for driving the laser or amplifying electrical signals from the photodiode, with the electrical wiring 501 via the bumps 510. In order to optically couple the core 503 of the film type optical waveguide 517 to the optical device 505, it is necessary to convert the optical path by 90°. For that reason, as one example, a mirror 507 for optical path conversion is formed in the film type optical waveguide 517 by dicing, for optical path conversion. An inclined surface 521 of the mirror 507 for optical path conversion is formed to be inclined at 45° to the optical axis of the core 503.

By arranging, on the film type optical waveguide (407, 517) wiring formed on flexible printed circuit 520, the electrical-to-optical conversion unit 406 or optical-to-electrical conversion unit 416 requiring very high positional accuracy (e.g., not more than a few μm for multimode core 503 on the order of 50 μm, or not more than sub-μm for single-mode core 503 on the order of 10 μm), fabrication accuracy of the rigid substrate 409 needs only to be within about a few tens of μm. Thus, it is possible to use the inexpensive rigid substrate 409.

Figure 8:
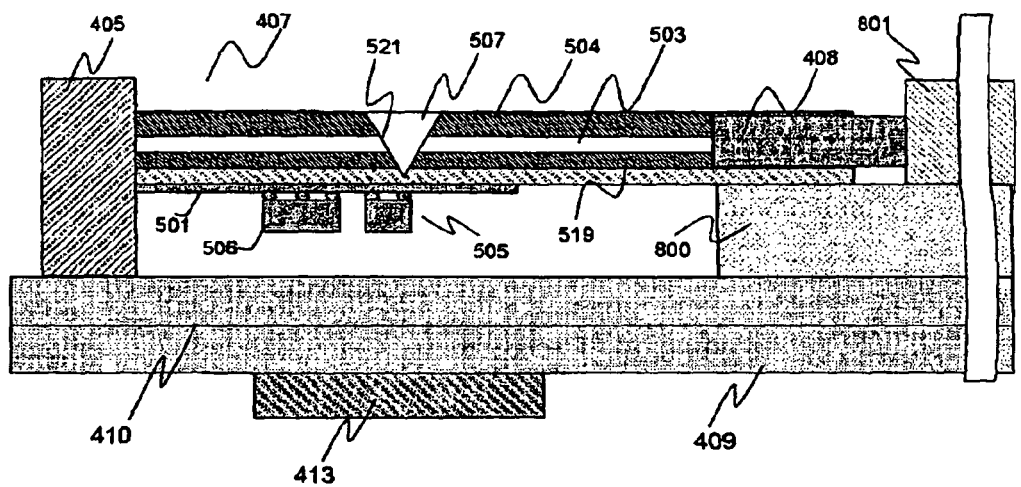
FIG. 8 is a schematic cross-sectional view showing a mounting structure of a film type optical waveguide.

Next is explained a mounting structure of the film type optical waveguide 407, referring to FIGS. 4, 5, and 8.

The electrical-to-optical conversion unit 406 and the optical-to-electrical conversion unit 416 are mounted on the surface of the film type optical waveguide 407, and mounted to face one side of the rigid substrate 409. On the other side of the rigid substrate 409, a voltage converter 413 is mounted.

Also, one end of the film type optical waveguide 407 is held by the card edge connector 405, while the other end of the film type optical waveguide 407 and an optical fiber covering portion 801 are held and fixed to a protection member 800 such as an optical fiber-protecting glass sheet using adhesive. The protection member 800 is mechanically connected and held with the rigid substrate 409 using an adhesive.

This structure allows the electrical-to-optical conversion unit 406 or optical-to-electrical conversion unit 416 to be protected from force applied when molding a resin material to form a chassis 403 for the combined optical and electrical transmission module.

On the other hand, electrical wiring is required on the surface of the film type optical waveguide 407 mounted with the electrical-to-optical conversion unit 406 and optical-to-electrical conversion unit 416 in FIGS. 4B and 4C. Accordingly, as exemplarily shown in FIG. 4C, when the optical device (416b, 406b) or IC (416a, 406a) constituting the electrical-to-optical conversion unit 406 and optical-to-electrical conversion unit 416 is arranged not between the film type optical waveguide 407 and the rigid substrate 409, but on the film type optical waveguide 407 surface away from the rigid substrate 409, in order to electrically connect an electrical wiring 418a on the rigid substrate 409 and the IC arranged in the film type optical waveguide 407 using an anisotropic conductive resin or non-conductive resin, it is necessary to provide electrical wirings 418b and 418c on both sides of the film type optical waveguide 407, and a through-hole 419 for electrically connecting the electrical wirings 418b and 418c.

Here, power for driving the laser-driving IC 406a and amplifying IC 416a is supplied through the electrical cable 402. In this case, using the voltage converter 413 such as a DC-DC (direct current-direct current) converter or AC-DC (alternating current-direct current) converter between the electrical cable 402 and the electrical wiring of the card edge connector 405, allows voltage from the electrical cable 402 to be matched to a voltage range for driving the laser-driving IC 406a and amplifying IC 416a. This allows use thereof without attention to voltage for driving the IC 406a and amplifying IC 416a, thereby broadening choices of the IC 406a and amplifying IC 416a used.

Further, as shown in FIGS. 4 and 8, the electrical-to-optical conversion unit 406 or optical-to-electrical conversion unit 416 is arranged on one side of the rigid substrate 409 to be mounted facing the film type optical waveguide 407, while the voltage converter 413 is arranged on the other side of the rigid substrate 409. A ground layer 410 is formed inside the rigid substrate 409. The ground layer 410 serves to shield the voltage converter 413 and the electrical-to-optical conversion unit 406 or optical-to-electrical conversion unit 416 from electromagnetic noise.

Accordingly, electromagnetic noise produced by the voltage converter 413 is less likely to electrically affect signal lines of the electrical-to-optical conversion unit 406 or optical-to-electrical conversion unit 416. This eliminates need to provide a metallic case for partially covering the ICs 406a and 416a to shield them from electrical noise, and therefore allows a saving on space.

The electrical cable 402 may be removed, and as shown in FIG. 6, an electrical connector 601 for connection with an external device may be connected directly to a rigid substrate 608.

Referring to FIGS. 4B and 4C, below is explained a construction of the combined optical and electrical transmission module.

The electrical cable 402 with the electrical connector 401 connected with an external device, comprises high-speed differential signal lines (2 pairs, 4 lines) 404, and a combined cable 414 comprising 4 low-speed signal lines and one GND line, and one 5 V power cable 415. Also, the combined optical, electrical and power cable 411 comprises the optical fiber (4-core GI 50 μm tape type) 408, the combined cable 414 comprising 5 low-speed signal lines and one GND line, and one 5 V power cable 412. And, the high-speed differential signal lines (2 pairs, 4 lines) 404 and the one 5 V power cable 415 are connected to the rigid substrate 409.

The rigid substrate 409 comprises a 3-layer structure of electrical wiring on its frontside and backside, and the ground layer 410 inside the rigid substrate 409. The 5 V power cable 415 of the electrical cable 402 is connected to the 5 V-input and 3.3 V-output voltage converter (DC-DC converter) 413. Power outputted from the voltage converter 413 is transmitted through a through-hole 450 to the backside of the rigid substrate 409 (i.e., opposite its surface mounted with the voltage converter 413).

Further, power is supplied to the IC 406a for driving the laser (e.g., a VCSEL (vertical cavity surface emitting laser)) 406b mounted on the film type optical waveguide 407 (with an FPC) connected by the card edge connector 405, to drive the laser 406b. The power cable 415 on the rigid substrate 409 branches into two before the voltage converter 413, cable 412 of which is not connected to the voltage converter 413, is part of the combined optical, electrical and power cable 411.

As shown in FIGS. 4B and 4C, using an optical fiber insertion groove 509 shown in FIG. 5B formed on the film type optical waveguide 407, the optical fiber 408 of the combined optical, electrical and power cable 411 is mounted on the film type optical waveguide 407, and fixed thereto by use of adhesive such as resin. Also, the film type optical waveguide 407 is connected and fixed to the rigid substrate 409 by the card edge connector 405. The high-speed differential signal lines 404 of the electrical cable 402 are connected to the surface of the rigid substrate 409 mounted with the laser 406b, to transmit signals with the IC 406a for driving the laser 406b through the card edge connector 405.

Also, the combined cable 414 comprising the low-speed signal lines and GND line, is arranged on the surface of the rigid substrate 409 mounted with the voltage converter 413. In a similar structure, the other end of the combined optical, electrical and power cable 411 is arranged with a combined optical and electrical transmission module mounted with a photodiode 416b in place of the laser 406b, and an amplifying IC 416a for amplifying signals from the photodiode 416b in place of the IC 406a for driving the laser. The chassis 403 of the module is fabricated by sheet metal processing of SUS and molding resin therearound.

Referring to FIGS. 7A to 7C, below are explained details of combined optical and electrical transmission modules 718 and 719 in another embodiment.

An electrical cable 702 with an electrical connector 701 connected with an external device, comprises high-speed differential signal lines (2 differential pairs, 4 differential lines)

704, and a combined cable 714 comprising 4 low-speed signal lines, one 5 V power cable and one GND line. Also, a combined optical, electrical and power cable 711 comprises an optical fiber (4-core GI 50 μm tape type) 708, a combined cable 714 comprising 4 low-speed signal lines, one 5 V power cable and one GND line, and one 12 V power cable 715. And, the 12 V power cable 715 and the high-speed differential signal lines (2 differential pairs, 4 differential lines) 704 are connected to a rigid substrate 709.

Further, the rigid substrate 709 comprises a 3-layer structure of electrical wiring on its frontside and backside, and a ground layer 710 within the rigid substrate 709. The 12 V power cable 715 is connected to a 12 V-input and 3.3 V-output voltage converter (DC-DC converter) 713. Power output from the voltage converter 713 is transmitted through a through-hole 750 to the backside of the rigid substrate 709 (i.e., opposite its surface mounted with the voltage converter 713). Power is supplied to an IC 706a for driving a laser 706b mounted in a film type optical waveguide 707 with a card edge connector 705, to drive the laser 706b. The 12 V power cable 715 branches into two before the voltage converter 713, cable 712 of which is not connected to the voltage converter 713, is part of the combined optical, electrical and power cable 711.

On the film type optical waveguide 707 is formed optical fiber insertion groove 509 shown in FIG. 5B, while the optical fiber 708 of the combined optical, electrical and power cable 711 is mounted in the film type optical waveguide 707, and fixed thereto by use of adhesive.

Further, the film type optical waveguide 707 is connected with the rigid substrate 709 by the card edge connector 705. The high-speed differential signal lines 704 of the electrical cable 702 are connected to the surface of the rigid substrate 709 mounted with the laser 706b, to transmit signals with the IC 706a for driving the laser through the card edge connector 705.

Also, the combined cable 714 comprising the low-speed signal lines, 5 V power cable and GND line, is wired and connected to the surface of the rigid substrate 709 mounted with the voltage converter 713. The other end of the combined optical, electrical and power cable 711 is arranged with the combined optical and electrical transmission module 718 mounted with a photodiode 717b in place of the laser 706b, and an amplification IC 717a for amplifying signals from the photodiode 717b in place of the IC 706a for driving the laser.

A chassis 703 of the module is fabricated by sheet metal processing of SUS and molding resin therearound.

An electrical connector 716 is attached to the tip of the 12 V power cable 715. Also, the length of the power cable 715 is shorter by about 10 cm than the length of the electrical cable 702, so that inadvertent pulling force is thereby unlikely to act on the electrical cable 702. Further, in FIG. 1B, the length of the power cable 15 is likewise shorter by the order of 10 cm than the length of the electrical cable 13.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A combined optical and electrical transmission assembly, comprising:
   a combined optical, electrical and power cable comprising an optical fiber, electrical wiring and a power line combined therein; and
   a combined optical and electrical transmission module comprising an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode,
   wherein, before entering to the combined optical and electrical transmission module, power cables branch off from both ends respectively of the combined optical, electrical and power cable, and combined optical and electrical cables, as which the combined optical, electrical and power cable is left by the power cables branching off therefrom, are each connected with the combined optical and electrical transmission module, and the combined optical and electrical transmission module is connected with an electrical cable for transmitting electrical signals with an external device, and
   wherein the branched power cables are not connected to the combined optical and electrical transmission module.

2. The combined optical and electrical transmission assembly according to claim 1, wherein a first electrical connector to be connected to the external device is attached to an end of the electrical cable and a second electrical connector to be connected to the external device is attached to an end of one of the power cables,
   wherein the electrical cable and the one of the power cables are connected to a same external device when used, and
   wherein a length of the power cables branching off from the combined optical, electrical and power cable is shorter than that from a position that the power cables branch off from the combined optical, electrical and power cable, to electrical connectors provided at tips of the electrical cables connected to the combined optical and electrical transmission modules.

3. A combined optical and electrical transmission module, comprising:
   a combined optical, electrical and power cable comprising an optical fiber, electrical wiring and a power line combined therein or a combined optical and electrical cable comprising an optical fiber and electrical wiring combined therein; and
   an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode,
   wherein a film type optical waveguide is disposed inside the combined optical and electrical transmission module, and the electrical-to-optical conversion unit and/or the optical-to-electrical conversion unit is disposed to the film type optical waveguide,
   wherein the film type optical waveguide is provided with an optical fiber insertion groove, and the optical fiber of the combined optical, electrical and power cable or the combined optical and electrical cable is inserted to the optical fiber insertion groove, to mount the optical fiber to the film type optical waveguide,
   wherein at least one of the laser and the photodiode is optically connected to the optical fiber via the film type optical waveguide, and
   wherein an electrical cable with an electrical connector connected to an external device is connected to a rigid substrate disposed inside the combined optical and electrical transmission module, and the film type optical waveguide disposed on a flexible printed circuit is connected to the rigid substrate by a card edge connector.

4. A combined optical and electrical transmission module, comprising:
   a combined optical, electrical and power cable comprising an optical fiber, electrical wiring and a power line combined therein or a combined optical and electrical cable comprising an optical fiber and electrical wiring combined therein; and
   an electrical-to-optical conversion unit comprising a laser for converting electrical signals to optical signals and a driving IC for driving the laser, and/or an optical-to-electrical conversion unit comprising a photodiode for converting optical signals to electrical signals and an amplification IC for amplifying electrical signals from the photodiode,
   wherein a film type optical waveguide is disposed inside the combined optical and electrical transmission module, and the electrical-to-optical conversion unit and/or the optical-to-electrical conversion unit is disposed to the film type optical waveguide,
   wherein the film type optical waveguide is provided with an optical fiber insertion groove, and the optical fiber of the combined optical, electrical and power cable or the combined optical and electrical cable is inserted to the optical fiber insertion groove, to mount the optical fiber to the film type optical waveguide,
   wherein at least one of the laser and the photodiode is optically connected to the optical fiber via the film type optical waveguide, and
   wherein an electrical cable with an electrical connector connected to an external device is connected to the rigid substrate, and the film type optical waveguide disposed on the flexible printed circuit is electrically connected to the rigid substrate by an anisotropic conductive resin or a non-conductive resin.

5. The combined optical and electrical transmission module according to claim 3, wherein:
   the electrical-to-optical conversion unit and/or the optical-to-electrical conversion unit is disposed between the film type optical waveguide and the rigid substrate.

6. The combined optical and electrical transmission module according to claim 3, wherein the combined optical and electrical transmission module is connected to both ends of the combined optical, electrical and power cable, and
   wherein the combined optical and electrical transmission module is provided with an electrical connector in place of the electrical cable, and electrically connected with an external device by the electrical connector.

7. The combined optical and electrical transmission module according to claim 4, wherein the combined optical and electrical transmission module is connected to both ends of the combined optical, electrical and power cable, and
   wherein the combined optical and electrical transmission module is provided with an electrical connector in place of the electrical cable, and electrically connected with an external device by the electrical connector.

8. The combined optical and electrical transmission assembly according to claim 1, wherein the combined optical and electrical cables are branched at the both ends of the combined optical, electrical and power cable.

9. The combined optical and electrical transmission assembly according to claim 1, wherein one of the power cables is not connected to the combined optical and electrical transmission module.

10. The combined optical and electrical transmission assembly according to claim 1, wherein a first electrical connector to be connected to the external device is attached to an end of the electrical cable and a second electrical connector to be connected to the external device is attached to an end of the power cable, and
   wherein the electrical cable and the power cable are connected to a same external device when used.

11. The combined optical and electrical transmission module according to claim 3, wherein the laser and the photodiode are optically connected to the optical fiber via the film type optical waveguide.

12. The combined optical and electrical transmission module according to claim 4, wherein the laser and the photodiode are optically connected to the optical fiber via the film type optical waveguide.

13. The combined optical and electrical transmission assembly according to claim 1, wherein a first electrical connector to be connected to the external device is attached to an end of the electrical cable and a second electrical connector to be connected to the external device is attached to an end of the power cable,
   wherein the electrical cable and the power cable are connected to a same external device when used, and
   wherein the second electrical connector is stronger in a connection strength than the first electrical connector.

14. The combined optical and electrical transmission assembly according to claim 2, wherein the second electrical connector is stronger in a connection strength than the first electrical connector.

15. The combined optical and electrical transmission assembly according to claim 1, wherein each of the ends of the combined optical, electrical and power cable is located at a distance form an entrance of the combined optical and electrical transmission module.

16. The combined optical and electrical transmission assembly according to claim 15, wherein each of the branched power cables is coupled between an electrical connector and a corresponding one of said each of the ends of the combined optical, electrical and power cable.

17. The combined optical and electrical transmission assembly according to claim 1, wherein each of the branched power cables is coupled, outside the combined optical and electrical transmission module, between an electrical connector and a corresponding end of the ends of the combined optical, electrical and power cable.

* * * * *